3,554,721
Patented Jan. 12, 1971

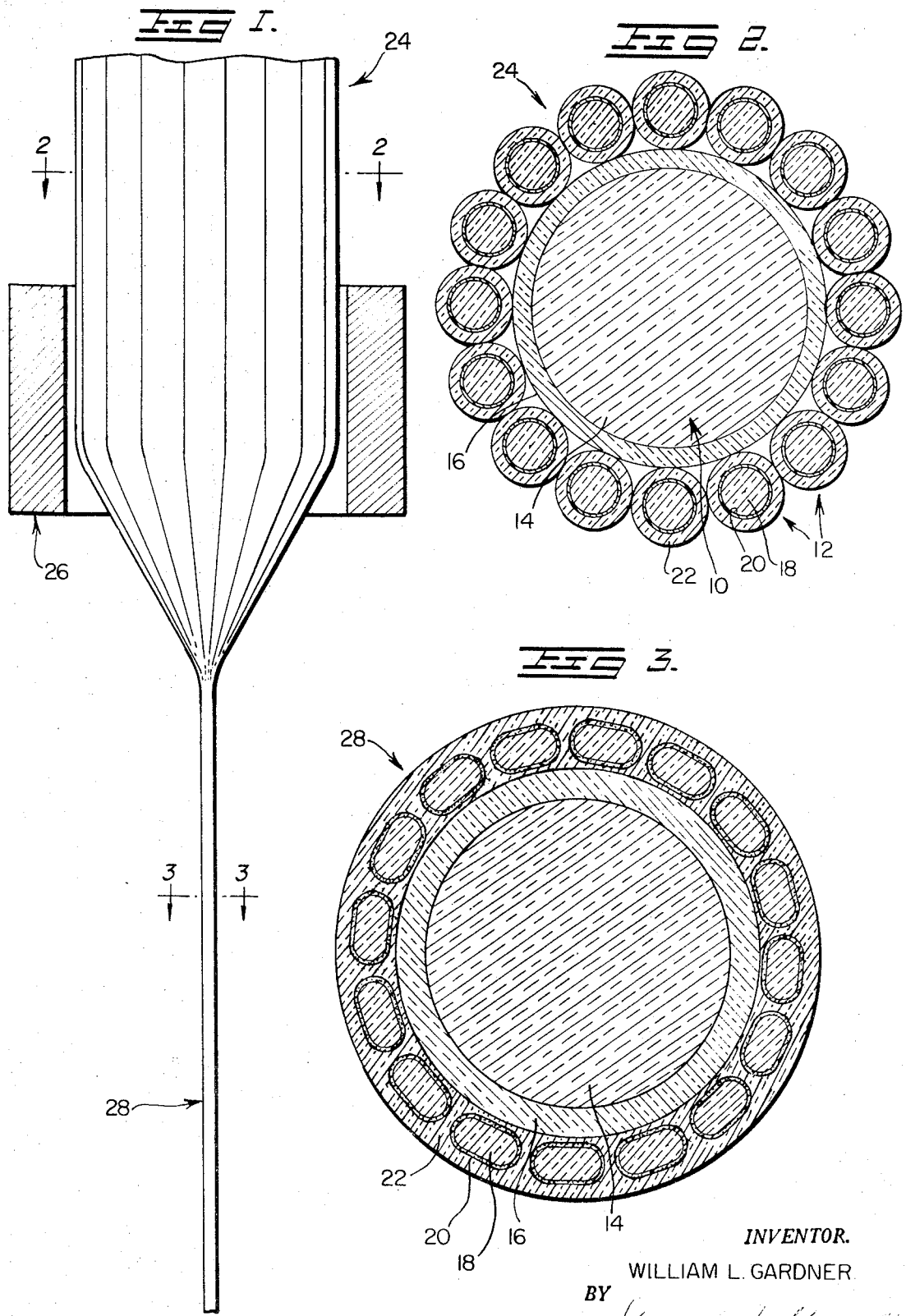

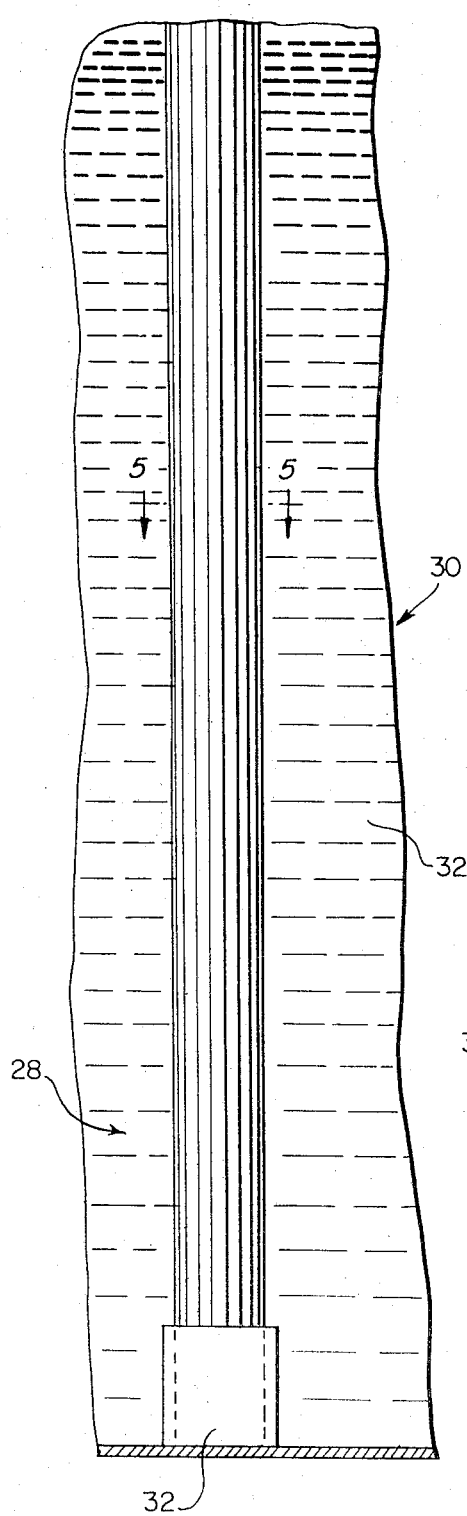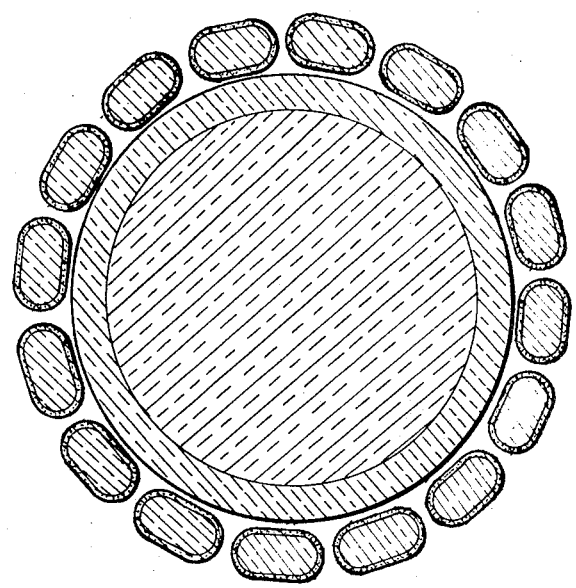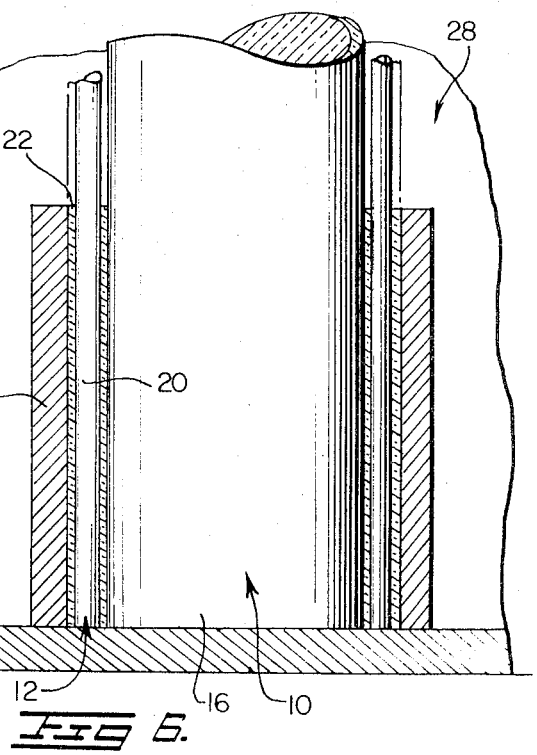

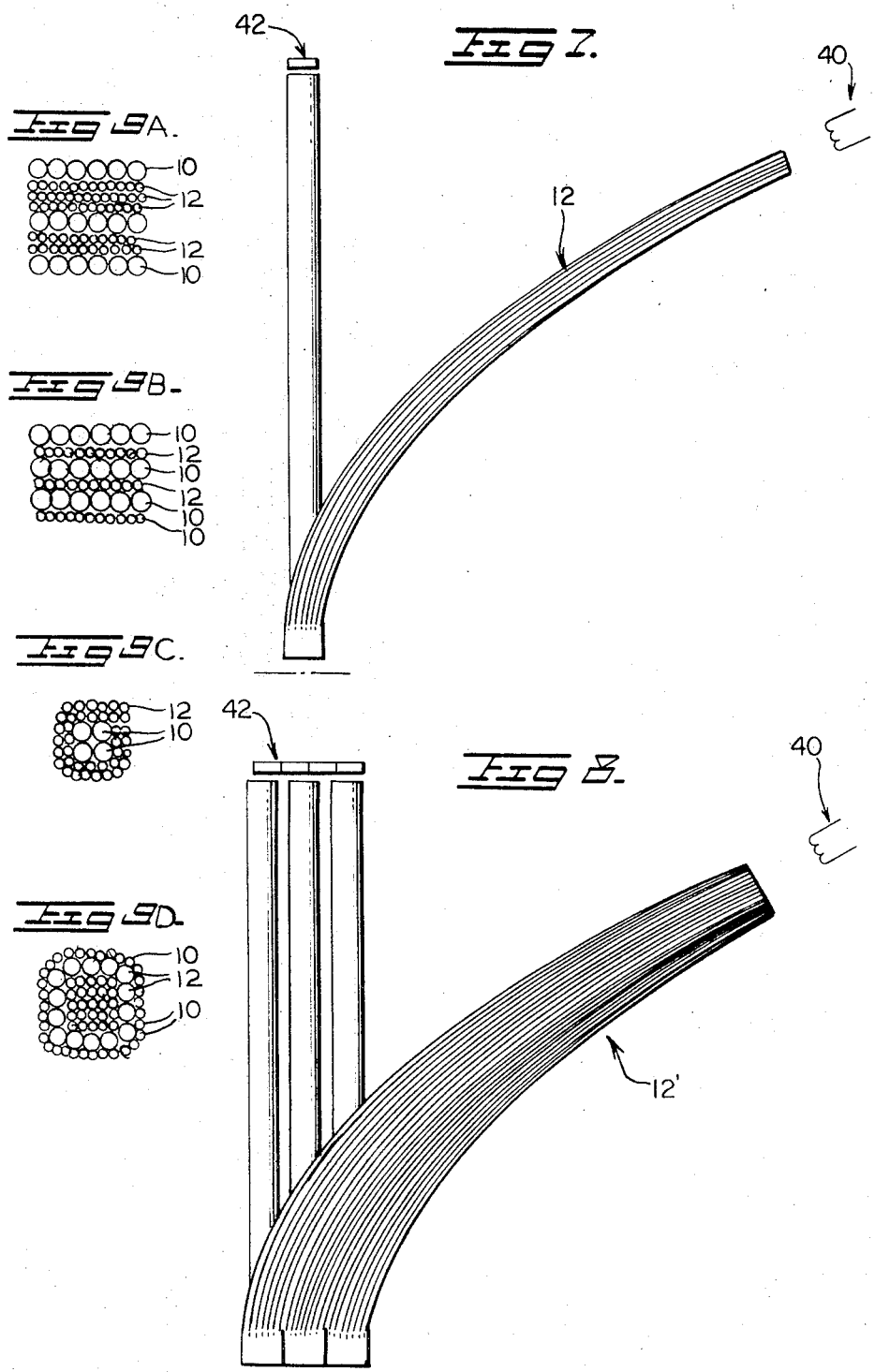

3,554,721
METHOD OF MAKING FIBER OPTIC BUNDLES
William L. Gardner, Wellesley, Mass., assignor to The Bendix Corporation, Detroit, Mich., a corporation of Delaware
Filed Jan. 10, 1968, Ser. No. 696,897
Int. Cl. C03b 37/00, 11/08; C03c 15/00
U.S. Cl. 65—4
7 Claims

ABSTRACT OF THE DISCLOSURE

A process of making a fiber optic reflective reader bundle having distinct illumination carrying fibers and signal or image carrying fibers differing substantially in diameters whereby the distinct fibers may be selectively segregated by their relative bending moments.

---

This invention relates to an improved method of fabrication and assembly of fiber optic bundles so as to provide greatly improved operational properties in applications wherein light conducting fibers are utilized to carry illumination from a source to a read area, and other fibers are employed to conduct reflected light from the area to detector means. Such assemblies and systems are used to, for example, inspect areas which may contain written or printed indicia to detect the presence or absence of the indicia.

Such arrays of fibers have in the past been fabricated in a wide variety of forms and the present invention concerns itself primarily with an improved fabrication method which to a large degree eliminates hand assembly required in the past and simultaneously following the method of the invention produces an array which greatly improves optical signal to noise characteristics of the system and allows reflection rather than transmission.

Typically in fiber optic reader bundles one or more fibers of a group of fibers may interchangeably serve as the illumination fibers conveying light from a source to the area to be illuminated; while the other fibers of the group serve as the pick-up fibers conveying reflected light to some form of optical detector. In general such fiber arrays are separated at one end so that those fibers employed in illuminating the copy may be associated with a source of illumination and the fibers employed in conducting the indicia image may be suitably connected to optical detectors. The separation of the fibers is also useful to minimize stray light leakage which would materially reduce the signal to noise characteristics of the device.

In the past, since most of the fibers of fiber optical readers were aligned and positioned by hand, the fibers themselves were rather large, that is, in the order of .008 to .040 inch in diameter. When employing fibers of this diameter it was also necessary to carefully design means for positioning and mingling the image conveying fibers in spaced relationship to the material to be read to insure positive overlap in the operational or functional cones of the image transmitting fibers. Spacing the ends of the image transmitting fibers from the material to be detected introduces distortion and a source of noise and stray light into the fiber ends.

It is a primary object of the present invention to provide a method of fabricating fiber optical bundles for reflective readers wherein much smaller fibers can be readily utilized and the fibers may be intermingled at the copy end so as to achieve optimum overlap regions.

A further object is to provide a method requiring a minimum of hand assembly to provide an assembly wherein the end surface of each of the read fibers may be directly in contact with the indicia to be read, thereby greatly improving the signal to noise ratio of the unit.

These and other objects and advantages are provided by a method of fabricating a composite bundle of optical fibers comprising drawing a first composite member comprising at least an optical core fiber and a lower index cladding, drawing a second composite member having a diameter less than the diameter of the first composite fiber member comprising at least an optical core and a lower index cladding, bundling the first and second composite members into a generally parallel array including a material more soluble than the lower index claddings on said composite members, drawing said array to form a third composite wherein each member of the first and second composites of the array is separated from the adjacent members of the array by said more soluble material and removing said more soluble material from an end portion of the third composite.

FIG. 1 diagrammatically illustrates a drawing procedure for a composite fiber employed in the structures made in accordance with the present invention;

FIG. 2 is a transverse section on line 2—2 of FIG. 1;

FIG. 3 is a transverse section on line 3—3 of FIG. 1;

FIG. 4 illustrates another step in the process of the invention;

FIG. 5 is an enlarged section on line 5—5 of FIG. 4;

FIG. 6 is an enlarged partial sectional view of the lower end of the composite illustrated in FIG. 4;

FIG. 7 diagrammatically illustrates one form of assembly manufactured in accordance with the present invention;

FIG. 8 illustrates a further form of reflective reader optical bundle constructed in accordance with the present invention; and FIGS. 9A, B, C, and D illustrate transverse cross-sections through certain geometric arrays of fibers.

Referring particularly to FIGS. 1, 2 and 3 of the drawings, the fiber optic reflective reader bundle is composed of at least a read out or signal carrying fiber 10 and illumination transmitting fibers 12. As to be more fully described hereinafter the fibers 10 and 12 are produced such that one of the fibers has a substantially larger diameter than the other whereby the two types of fibers may be segregated selectively by their bending moments. It is also pointed out that while fibers 10 have been designated as signal carrying fibers and fibers 12 as illumination transmitting fibers, the fibers are interchangeable in both the multiple and single fiber arrays.

In the illustrated form of the invention the optical image transmitting fibers, generally designated 10, are composed of an optical core 14 provided with a lower index of refraction cladding 16. The relative diameter of the core fiber 10 to its cladding 16 and the relative indices of the core 10 to the cladding 16 should be selected in accordance with, for example, the known principles involving image transmitting optical fibers.

The fibers 10 may be formed by conventional vitreous fiber drawing techniques such as those disclosed in U.S. Pat. 3,146,082, J. W. Hicks, Jr. et al., wherein an optical core is positioned in the center of a cladding glass tube; the rod and tube are selectively lowered through a heater zone and a fine fiber is drawn from the lower end of the assembly adjacent the heater zone.

The light transmitting fibers generally designated 12, in FIG. 2 of the drawings, are composed of a high index glass core 18 and a relatively lower index cladding 20 and in the preferred embodiment each of the fibers 12 has a third cladding 22 formed of a material that is substantially more soluble than the cladding 20 of the fibers 12 or the cladding 16 of the fibers 10. The three unit fibers 12 may be drawn, as illustrated for example in FIG. 6 of U.S. Pat. 3,294,504, J. W. Hicks, Jr.

After formation of the first clad fiber or composite assembly 10 and the second clad fibers or composite members 12, the drawn fibers are assembled as illustrated in FIG. 2 to form a bundle. The elements of the bundle may be, for example, from six to thirty-six inches in length and the center core fiber 10 may be, for example, as much as two or three inches in diameter while the light transporting fibers 12 may be correspondingly smaller.

The bundle 24 is suspended above a heater generally designated 26, FIG. 1 of the drawings, and the bundle 24 is slowly lowered through the heating zone while a composite fiber 28 is drawn from the lower end. This drawing step fuses the outer cylindrical surface of the cladding 16 of the fiber 10 to the highly erodable or soluble cladding 22 of each of the fibers 12 to form a unit such as illustrated in FIG. 3. If the finished product is to comprise a single read unit with a plurality of illumination transmitting fibers 12 thereabout the structure shown in FIG. 3 is then ready for selectively segregating the read fiber from the illuminating fibers. However, if the composite or optical reader bundle is to be composed of a plurality of image transmitting fibers, such as illustrated as 10' in FIG. 8, each of which would in turn be surrounded by a plurality of illumination transmitting fiber bundles 12', then a plurality of the units 28 would be stacked like cord wood in parallel aligned relationship. The bundle may then be placed in a suitable mold, heated and pressed to form a fused composite or the bundle could be suspended above a heater, such as illustrated at 26, whereby a further composite fiber would be drawn consisting of a plurality of image transmitting fibers and a plurality of light transmitting fibers.

Whether the finished unit is to comprise a single image transmitting fiber or a plurality of such image transmitting fibers, the composite assembly, such as illustrated at 28 in FIGS. 1 and 3 of the drawings, is placed in an etching bath generally designated 30 in FIG. 4 of the drawings after the lower end $x$ of the composite member is coated with an acid resist 32. The acid resist 32 may comprise beeswax, an epoxy resin or the like which is generally unsoluble in the selected acid in the etching bath 30. While the assembly 28 is in the etching bath 30, the etchant 32 removes the highly soluble or highly etchable matrix material 22 from about the outer surface of the cladding glass 16 of the fiber 10 and the cladding glass 20 of the fibers 12 so that a section through the fibers, say for example on line 5—5 of FIG. 4, would appear as shown in FIG. 5, with the light transmitting fiber in free association except at their lower ends $x$ where the acid resisting material 32 protects the formed assembly.

Once the bundle has been etched as illustrated in FIGS. 5 and 6, segregation of the light transmitting fibers 12 from the image transmitting fibers 10 is accomplished by means of the higher bending moment of finer fibers 12 relative to the larger diameter fiber 10 as shown in FIGS. 7 and 8, with the smaller diameter fibers bending away from the more rigid larger diameter fibers 10 and 10'. With the fibers in such separated and segregated relationship they may be easily bunched and suitably associated with a light source illustrated as filament 40 in FIGS. 7 and 8 while the image transmitting fibers 10 and 10' are associated with suitable optical image detecting means 42.

If the fiber optic reflective reader bundles are to be used to read the stroke or line of typewriter type size characters, which have a stroke width of approximately .010 inch, the fiber diameter of an assembly to read such characters should be no larger than this, and preferably substantially smaller. For example, image transmitting or read fibers, very suitable for reading typewriter type size characters, may be made approximately .0035 inch in diameter. With fibers of this diameter very satisfactory fiber segregation and separation may be brought about if the illumination or light transmitting fibers are made with diameters of about .002 inch. With such an assembly once the bonding matrix of highly etchable material is removed from the assembled bundle the light transmitting and smaller diameter fibers may be readily separate from the larger fibers on the basis of their flexing variations. For example, it has been found that if such an assembly is submerged in a liquid such as water and moved rapidly back and forth, the flexure variation of the two different diameter fibers allow an operator to achieve separation of complex intermingled fiber arrays.

While the cores of the fibers 10 and 12 and their light shielding claddings 16 and 20 respectively may be formed of a number of suitable vitreous materials, as is known in the fiber optical arts, the following flint and barium dense flint glass compositions are suitable for the high index of refraction glass cores 14 and 18:

| Flint: | Percent by weight |
|---|---|
| $SiO_2$ | 44.9 |
| $Na_2O$ | .5 |
| $K_2O$ | 8 |
| PbO | 46.6 |
| Barium dense flint: | |
| $SiO_2$ | 43.3 |
| $Na_2O$ | .7 |
| $K_2O$ | 7.5 |
| PbO | 32.6 |
| BaO | 10.8 |
| ZnO | 5.1 |

A suitable lower index of refraction glass for use as the cladding glasses 16 and 20 may comprise:

| | Percent by weight |
|---|---|
| $SiO_2$ | 80.6 |
| $B_2O_3$ | 13.0 |
| $Na_2O$ | 3.8 |
| $K_2O$ | .4 |
| $Al_2O_3$ | 2.2 |

The matrix glass 22 or the glass forming the second cladding on, for example, the light transmitting fibers, which is readily etchable may comprise one of the lanthanum silicate glasses which may be chemically etched with, for example, 0.1 normal nitric acid. Such a lanthanum silicate glass may comprise:

| | Percent by weight |
|---|---|
| $SiO_2$ | 12 |
| $Al_2O_3$ | 3 |
| BaO | 48 |
| $B_2O_3$ | 17 |
| $La_2O_3$ | 20 |

In general if the diameters of the fibers to be separated vary by at least about 10%, suitable separation of the fibers in accordance with the present method may be carried out.

The particular arrangement of the fibers of the arrays shown and described hereinabove represent only typical arrangements and many variations are possible. For example, FIGS. 9A, B, C and D are diagrammatic transverse sections through four other positioned arrangements of large and small diameter fiber arrays which are within the scope of the present invention.

I claim:
1. A method of fabricating a bundle of optical fibers composed of at least first and second groups of optical fibers differing from each other by their relative diameters and bending moments comprising:
 (1) drawing a first composite member composed of at least an optical core fiber and lower index cladding;
 (2) drawing a second composite member having a greater bending moment than the said first composite member and a smaller diameter than the diameter of said first composite member, and comprising at least an optical core and a lower index cladding;
 (3) applying, on the first and second composite members, an external coating of a material more soluble than the lower index claddings on the core fibers of the first and second composite members;
 (4) drawing a third composite member from a bundle of the first and second composite members with the more soluble coating of material separating the first and second composite members from adjacent members;

(5) removing said more soluble material from a zone including at least an end portion of the third composite member to thereby free the first and second composite members in the said zone from which the more soluble material is removed; and (6) thereafter segregating the first and second composite members in said end portion by their different bending moments into at least two distinct first and second groups of optical fibers.

2. The invention defined in claim 1 wherein the material more soluble than the lower index cladding on the composites comprises a third vitreous cladding on each of the fibers comprising the second composite member.

3. The invention defined in claim 1 wherein the diameter of the first composite member is at least about 10% larger than the diameter of the second composite members.

4. The invention as defined in claim 3 wherein the more soluble material is removed from the third composite, except for one end portion thereof.

5. The invention defined in claim 1 wherein the more soluble material comprises a lanthanum silicate glass.

6. The invention defined in claim 5 wherein the lanthanum silicate glass is removed by etching.

7. The invention defined in claim 6 wherein the etchant is nitric acid.

References Cited

UNITED STATES PATENTS

| | | | |
|---|---|---|---|
| 2,995,970 | 8/1961 | Hicks, Jr. et al. | 65LRDig |
| 3,004,368 | 10/1961 | Hicks, Jr. | 65—31X |
| 3,068,742 | 12/1962 | Hicks, Jr. et al. | 65LRDig |
| 3,247,755 | 4/1966 | Siegmund | 65—4X |
| 3,332,757 | 7/1967 | Hawkins | 65—4 |
| 3,453,440 | 7/1969 | Muir et al. | 65LRDig |

OTHER REFERENCES

Popular Science, April 1963, vol. 182, No. 4, pp. 120 and 121.

FRANK W. MIGA, Primary Examiner

U.S. Cl. X.R.

65—3, 31, 37, 38